United States Patent
Maliuk et al.

(10) Patent No.: US 10,506,198 B2
(45) Date of Patent: Dec. 10, 2019

(54) VIDEO STREAM ENCODING SYSTEM WITH LIVE CROP EDITING AND RECORDING

(71) Applicant: Livestream LLC, Brooklyn, NY (US)

(72) Inventors: Sergii Maliuk, Brooklyn, NY (US); Philip Tomasz Worthington, New York, NY (US); Jimmy S. An, Hillsborough, NJ (US); Shi Gang Yuan, Brooklyn, NY (US); Jesse H. Hertzberg, New York, NY (US); Maxime G. G. Haot, New York, NY (US)

(73) Assignee: Livestream LLC, Brooklyn, NY (US)

( * ) Notice: Subject to any disclaimer, the term of this patent is extended or adjusted under 35 U.S.C. 154(b) by 0 days.

(21) Appl. No.: 15/366,950

(22) Filed: Dec. 1, 2016

(65) Prior Publication Data
US 2017/0163929 A1     Jun. 8, 2017

Related U.S. Application Data

(60) Provisional application No. 62/263,364, filed on Dec. 4, 2015.

(51) Int. Cl.
*H04N 5/77*     (2006.01)
*H04N 5/775*     (2006.01)
(Continued)

(52) U.S. Cl.
CPC ......... *H04N 5/775* (2013.01); *G06F 3/04842* (2013.01); *G06F 3/04845* (2013.01);
(Continued)

(58) Field of Classification Search
CPC .. H04N 5/775; H04N 5/23293; H04N 5/2628; H04N 5/77; G06K 9/4671; G11B 27/031
(Continued)

(56) References Cited

U.S. PATENT DOCUMENTS 9,172,978 B2 * 10/2015 Zdepski ............ H04N 21/23424
9,729,870 B2 * 8/2017 Zhai ...................... H04N 19/50
(Continued)

FOREIGN PATENT DOCUMENTS

| KR | 10-1458620 B1 | 11/2014 |
| KR | 101458620 B1 | 11/2014 |
| WO | 2015126144 | 8/2015 |

OTHER PUBLICATIONS

PCT, International Search Report and Written Opinion for International Application No. PCT/US2016/064708, dated Mar. 7, 2017, 12 pages.
(Continued)

*Primary Examiner* — Helen Shibru
(74) *Attorney, Agent, or Firm* — Lowenstein Sandler LLP

(57) ABSTRACT

Implementations of the disclosure provide for video stream encoding system with live crop editing and recording. In one implementation, the method comprises receiving, by a camera device, an input video stream depicting an image. A first video stream and a second video stream are generated based on the input video stream. A crop instruction associated with the image is received based on user input. A region of interest in the first stream is determined based on the crop instruction. The first stream depicts a full field of view of the image associated with the input video stream. A cropped view presentation of the full field of view is generated to associate with the second stream in accordance with the region of interest. Thereupon, a portion of the cropped view presentation of the second stream is provided for display at a network device.

16 Claims, 8 Drawing Sheets

(51) Int. Cl.
*G06F 3/0484* (2013.01)
*G06K 9/46* (2006.01)
*G11B 27/031* (2006.01)
*H04N 5/232* (2006.01)
*H04N 5/262* (2006.01)
*G06F 3/0488* (2013.01)

(52) U.S. Cl.
CPC .......... *G06K 9/4671* (2013.01); *G11B 27/031* (2013.01); *H04N 5/23293* (2013.01); *H04N 5/2628* (2013.01); *G06F 3/04883* (2013.01); *G06K 2009/4666* (2013.01)

(58) Field of Classification Search
USPC .................................................. 386/224, 278
See application file for complete search history.

(56) References Cited

U.S. PATENT DOCUMENTS

| | | | | |
|---|---|---|---|---|
| 9,851,868 | B2* | 12/2017 | Elmieh | ................ G06F 3/0482 |
| 9,870,802 | B2* | 1/2018 | Carson | .................... G11B 27/34 |
| 10,386,999 | B2* | 8/2019 | Burns | ............. H04N 21/47217 |
| 2005/0151851 | A1 | 7/2005 | Schnell | |
| 2007/0041727 | A1 | 2/2007 | Lee | |
| 2007/0061862 | A1 | 3/2007 | Berger et al. | |
| 2011/0044550 | A1 | 2/2011 | Tian et al. | |
| 2012/0197357 | A1 | 8/2012 | Dewey et al. | |
| 2013/0027581 | A1 | 1/2013 | Price et al. | |
| 2014/0044404 | A1 | 2/2014 | Grundmann et al. | |
| 2014/0313341 | A1* | 10/2014 | Stribling | ................ H04L 67/02 348/157 |
| 2014/0320675 | A1* | 10/2014 | Lin | .................... H04N 5/23222 348/207.1 |
| 2014/0320740 | A1 | 10/2014 | Wan et al. | |
| 2014/0348498 | A1 | 11/2014 | Aiba | |
| 2016/0041724 | A1* | 2/2016 | Kirkby | ................ G06K 9/6267 715/719 |
| 2016/0165309 | A1* | 6/2016 | Van Brandenburg | ........................ H04N 21/4728 725/116 |
| 2016/0381306 | A1* | 12/2016 | Yang | ........................ G06T 3/40 386/280 |
| 2017/0118540 | A1* | 4/2017 | Thomas | ............. H04N 21/2343 |
| 2018/0050634 | A1 | 2/2018 | White et al. | |

OTHER PUBLICATIONS

PCT, International Search Report and Written Opinion for PCT/US2016/064712, dated Mar. 3, 2017, 16 pages.
International Search Report for PCT Patent Application No. PCT/US2016/064712 dated Mar. 3, 2017, 16 pages.

* cited by examiner

VIDEO STREAM ENCODING SYSTEM WITH LIVE CROP EDITING AND RECORDING

CROSS-REFERENCE TO RELATED APPLICATIONS

This application claims the benefit of U.S. Provisional Application No. 62/263,364 filed Dec. 4, 2015, the disclosure of which is incorporated herein by this reference in its entirety.

TECHNICAL FIELD

Embodiments of the current disclosure relate generally to live video-editing and publishing and, more specifically, to a video stream encoding system with live crop editing and recording.

BACKGROUND

Many services provide live editing of video feeds from multiple camera angles. For example, some services may edit a live broadcast shown to viewers by changing the broadcast from one camera perspective to another camera perspective. In many situations this is accomplished, by swapping between video feeds from the multiple cameras filming at some event or mixing the video feeds together. Traditionally, the services may use specialized and expensive video editing equipment that is in communication with the multiple cameras positioned in different locations at the event.

BRIEF DESCRIPTION OF THE DRAWINGS

The present disclosure is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Embodiments of the present disclosure provide a video stream encoding system with live crop editing and recording. According to the present disclosure, the system provides seamless live video streaming to a network cloud infrastructure. In one embodiment, the system can edit an output view field of live video to stream only a cropped area on the cloud while the full field of view is published to a display. In some embodiments, the system includes a camera that is capable of capturing a single uncompressed ultra-high definition (e.g., 4K video) video stream from an imaging sensor and producing two streams in which a first stream (e.g., without a crop view) is for use by an operator and the second stream is with a cropped view for viewers. Thus, the system provides a live multiple-camera production environment from a single camera input video steam.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

The present disclosure is related to a system for performing the operations herein. This system may be specially constructed for the required purposes or it may comprise a general purpose computing device selectively activated or reconfigured by a computer program stored therein. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

In some embodiments, the computer program product, or software may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Figure 1:
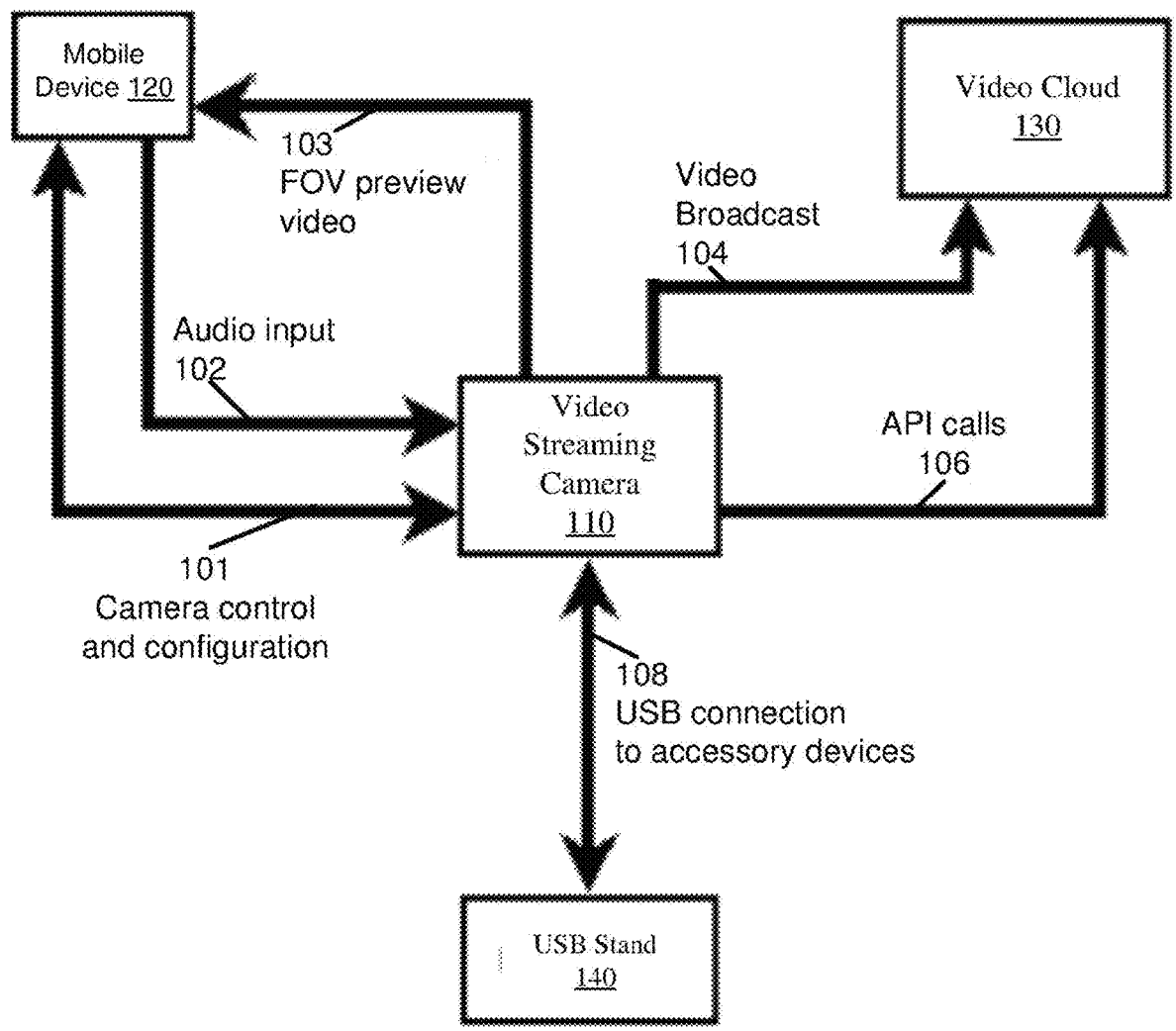
FIG. 1 is a block diagram illustrating a system in which embodiments of the present disclosure may operate.

FIG. 1 is a block diagram illustrating a system 100 in which embodiments of the present disclosure may operate. In some embodiments, the system 100 may include a video streaming camera 110 in communication with a mobile device 120 and a video cloud 130. In some embodiments, the video streaming camera 110 can be coupled to a USB stand via a USB connection 108 for connecting to one or more accessory devices. In one embodiment, the camera 100 can generate a Wifi hotspot in which the mobile device 120 can sign onto for communication of video stream data from the camera 100. In other embodiments, the camera 110 can be wireless coupled to the mobile device 120 and the video cloud 130 via a network connection. (e.g., Wifi/Bluetooth).

In some embodiments, the video streaming camera 110 may be camera capable of capturing a video image and produce multiple encoded video streams. This allows the system 100 to crop video produced by one stream while a full view video feed is produced on the other stream. For example of a type of camera 110 that can be used in conjunction with system 100 is described in co-pending and commonly assigned U.S. patent application Ser. No. 15/366,872, entitled "INTERACTIVE DIGITAL CAMERA FOR LIVE CROP EDITING AND RECORDING OF VIDEO STREAMS," the contents of which are incorporated herein in their entirety. Alternatively, system 100 does not have to use a dedicated type of camera instead the video streaming camera 110 can be another type of camera or a camera incorporated in a computing device. In one embodiment, the camera 110 may utilize an application associated with the mobile phone, such as a phone app. In other embodiments, the camera 110 is a phone app controlled by another phone app. Still further, the camera 110 and a controller for the camera 110 may be in a single phone app. In some embodiments, the user may have to install the application and/or select a service in order to obtain the benefits of the techniques described herein.

In some embodiments, the mobile device 120 may be used to control aspects of the camera 110 as well as to display, edit and record the video streams produced by the camera 110. By way of example only, mobile device 120 may be a computing device, such as a mobile phone, a laptop computer, a netbook, a desktop computer, and a portable personal computer such as a wireless-enabled PDA, a tablet PC or another type of computing device capable of obtaining information via a network like the Internet. In some embodiments, to control the camera 110, an application may be downloaded onto mobile device 120. For example, a user may elect to download the application from a service associated with an online server. In one embodiment, the mobile device 120 may transmit a request for the application over a network and in response, receive the application from the service. The application may be installed locally at the mobile device 120. Alternatively, the application can be stored at the service and may be accessed through the mobile device 120, for example, via a mobile web browser.

In some embodiments, the video cloud 130 includes a network infrastructure made up of components that may include a server computing device for storing and publishing video streams and other relevant data. Alternatively, the video cloud 130 may include multiple computing server devices with components that can be geographically dispersed at different locations, such as at a server farm.

In operation, the camera 110 consumes several types of data streams that include video and audio input data 102. This data is needed to start a video broadcast 104. In some embodiments, the video broadcast 104 may be integrated into API calls 106 so that all data exchanged with the video cloud 130 will be secure. In some embodiments, the camera 110 includes a set of commands, such as camera control and configuration instructions 101, for controlling a video preview or broadcast. In some embodiments, a full field of view (FOV) 103 of a live video stream is sent to the mobile device 120. The purpose of this FOV stream is to allow an operator to select a region of interest (ROI) for video broadcast 104 by the camera 110. The ROI includes a live edited video stream that may be sent to the video cloud 130 for broadcast to viewers and/or stored in the video cloud 130. This out stream for presentation may include an ROI in the full FOV or the full FOV itself. The out stream may include a stream of video images of a certain frames-per-second that are encoded using a particular encoding scheme (e.g., JPEG).

Figure 2:
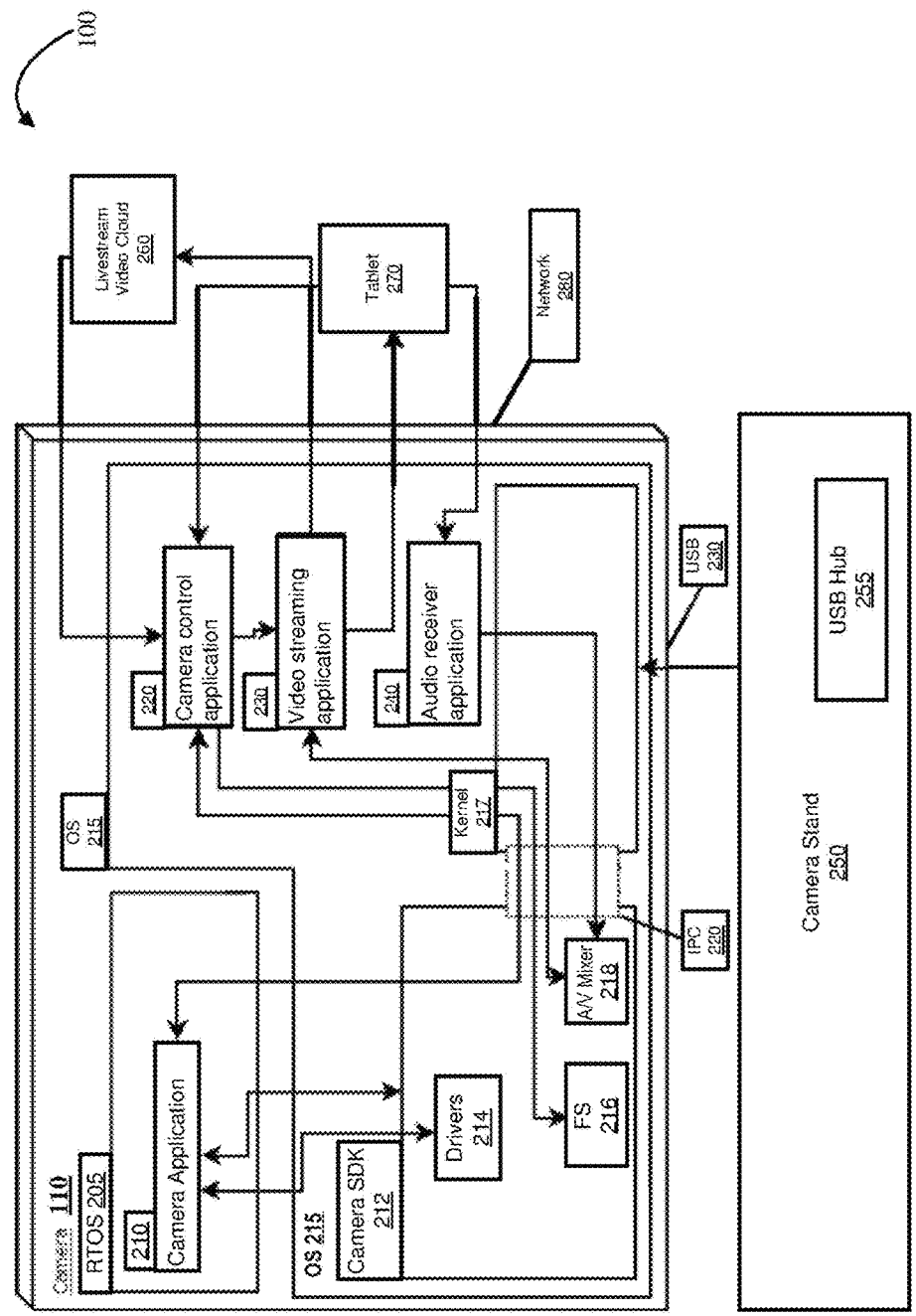
FIG. 2 is another block diagram illustrating the system in which embodiments of the present disclosure may operate.

FIG. 2 is another block diagram 200 illustrating the system 100 in which embodiments of the present disclosure may operate. In this example, the system 100 includes video streaming camera 110 in communication with a mobile device, such a tablet 270 and video cloud 260. As shown, the system 100 may include several applications (e.g., a camera control application 210, camera control application 220, video streaming application 230 and audio receiver application 240) running under an operating system 215 (e.g., Linux) of the camera 110. In some embodiments, the system 100 includes a component (e.g., RTOS 205) that is responsible for data generation (either RAW or encoded), firmware (FW) management, hardware (HW) management, image quality services, and writing of encoded data, for example, to a file on an SD card. The operating system 215 may include a kernel 217 that is responsible for all connectivity-related operations that includes, but not limited to, Bluetooth, Wifi, Ethernet, USB interface 230 for connecting to a USB hub 225 of a camera stand 250 to support the camera device 110 as well as other types of connectivity-related operations. The SDK (software developed kit) 212 offers a programmable interface for or communicatively coupling certain drivers 214, file systems (FS) 216, video format interfaces, such as an audio/video mixer 218, and inter-process communication (IPC) 220 objects for messaging and data transfer, which may be used for transmitting encoded data streams over a network connection 280 and for passing events from the RTOS 205 to and from the operating system 215.

Figure 3:
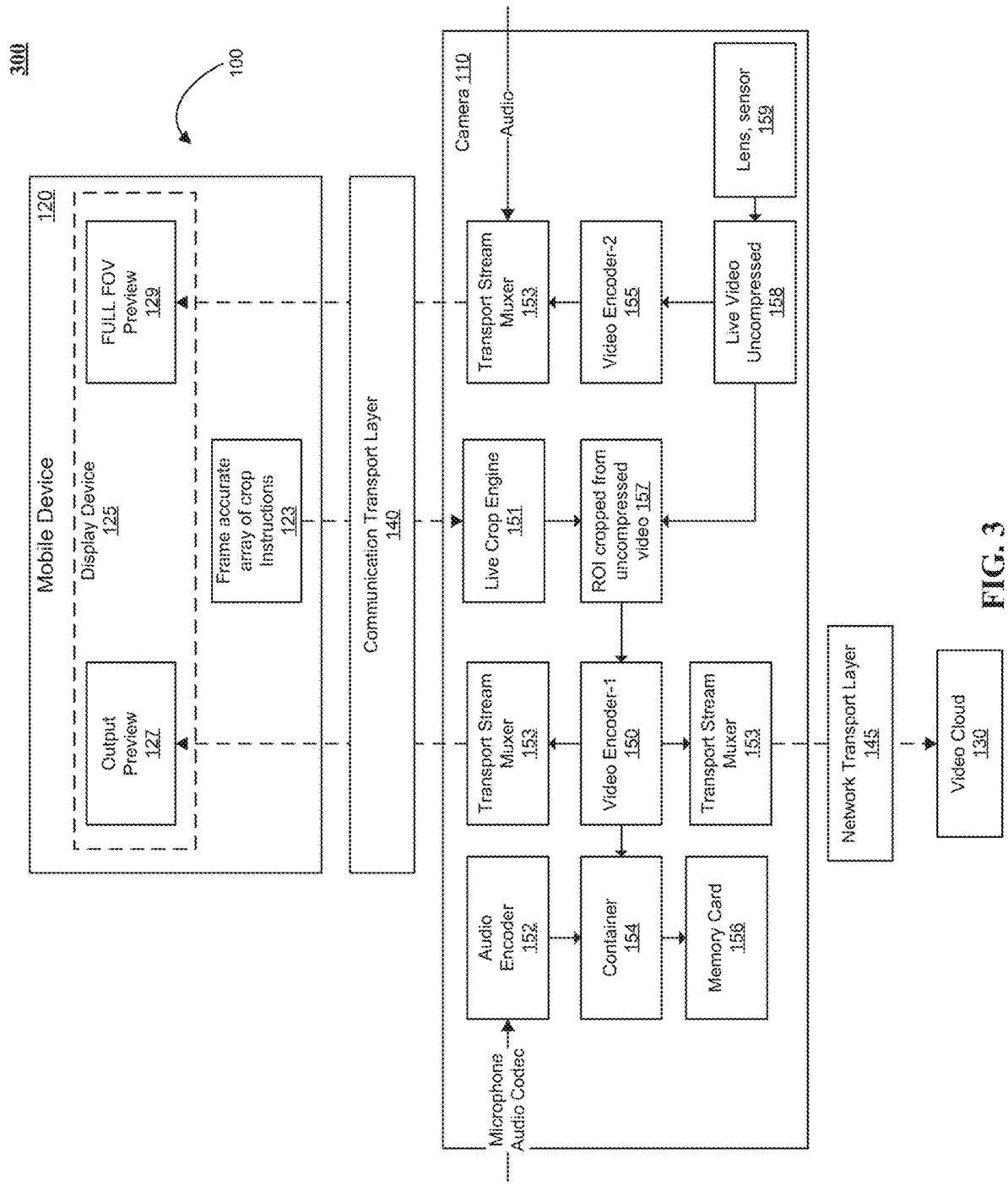
FIG. 3 is yet another block diagram illustrating the system in which embodiments of the present disclosure may operate.

FIG. 3 is yet another block diagram 300 illustrating the system 100 in which embodiments of the present disclosure may operate. As shown, the system 100 is comprised of several components that may include components of system 100, such as a video streaming camera 110 in communication with a mobile device 120 and a video cloud 130. In some implementations, the camera 110 of system 300 may include an audio encoder 152 for receiving audio via microphone accessory or integrated microphone, two video encoders (e.g., video encoder 1 150, video encoder 2 155) and a live crop engine 151 amongst other components. In some embodiments, the system 100 may receive live uncompressed video data 158, for example, via lens and/or sensors 159 of the camera 110 that is then encoded using the two video encoders 150 and 155. The two video encoders each produced a stream of video images from the live uncompressed video data 158 where one stream has a full FOV and the other stream is with the cropped view for viewers. In some embodiments, the system 100 can switch an output video to stream only a cropped area of the uncompressed video stream. For example, a full FOV 129 of the video stream may be transmitted to a display device 125 of the mobile device 120 for previewing while a cropped version (e.g., output preview 127) of the full FOV 129 may be transmitted to the video cloud 130 via network transport layer 145 or provided to the mobile device 125 for display as output preview 127. In this regard, the camera device 110 include one or more transport stream multiplexers 153 is configured to adaptively transmit packets via the communication transport layer or network transport layer 145 so as to synchronize the playback of audio/video data on the mobile device 120 and video cloud 130. In some implementations, the full FOV 129 and/or cropped version 127 may be stored, for example, in a removable memory card 156 by wrapping the images in a type of multimedia container 154 that can be stored on the memory card 156.

To edit the full FOV captured by the camera 120, the system 100 includes a live crop engine 151. In some embodiments, the live crop engine 151 may receive certain crop instructions 123 from the mobile device 120, via the communication transport layer 140, for editing the full FOV. For example, the live crop engine 151 may receive the crop instructions 123 from an interface installed at the mobile device 120. The interface allows a user to select a certain ROI from the full FOV that is then streamed to the video cloud 130. In one embodiment, only the crop instructions 123 are sent between the mobile device 120 and the camera 110. Hence, the cropped video stream originates from the camera 110 to the video cloud 130. An advantage of only sending crop instructions from the mobile device 120 to the camera 110 is that less data is needed to be transmitted over the communication transport layer to produce the cropped images, which may increase the throughput performance of system 100.

In operation, when a ROI is selected at the mobile device 120, a crop instruction is sent to the live crop engine to identify a corresponding region in the live uncompressed video. For example, the corresponding region may be identified based on the coordinates of the ROI that corresponds to a region in the full FOV. Thereafter, the ROI is encoded for transmission to the video cloud 130. In some embodiments, the live crop engine 151 may select one or more frames from the uncompressed video to transition back and forward from the full FOV and the ROI for an output stream being sent to the view cloud 130, for example, for display at an output network device associated with the cloud. In one embodiment, a smoothing algorithm is used so that the transition in the output stream is adjusted for visual appeal.

In some embodiments, system 100 may include an array of different type of crop instructions 123 for editing the full FOV to create a cropped image stream presentation based on the ROI. These crop instructions 123 may include, but not limited to, a pinch to zoom instruction, tap to cut instruction, drag to pan instruction, computer aided vision and audio fining and tracking instruction, live editing decisions instruction as well as optimization instruction for the full FOV in view of the selected ROI. Some examples illustrating these types of live crop instructions are further discussed below.

Figure 4:
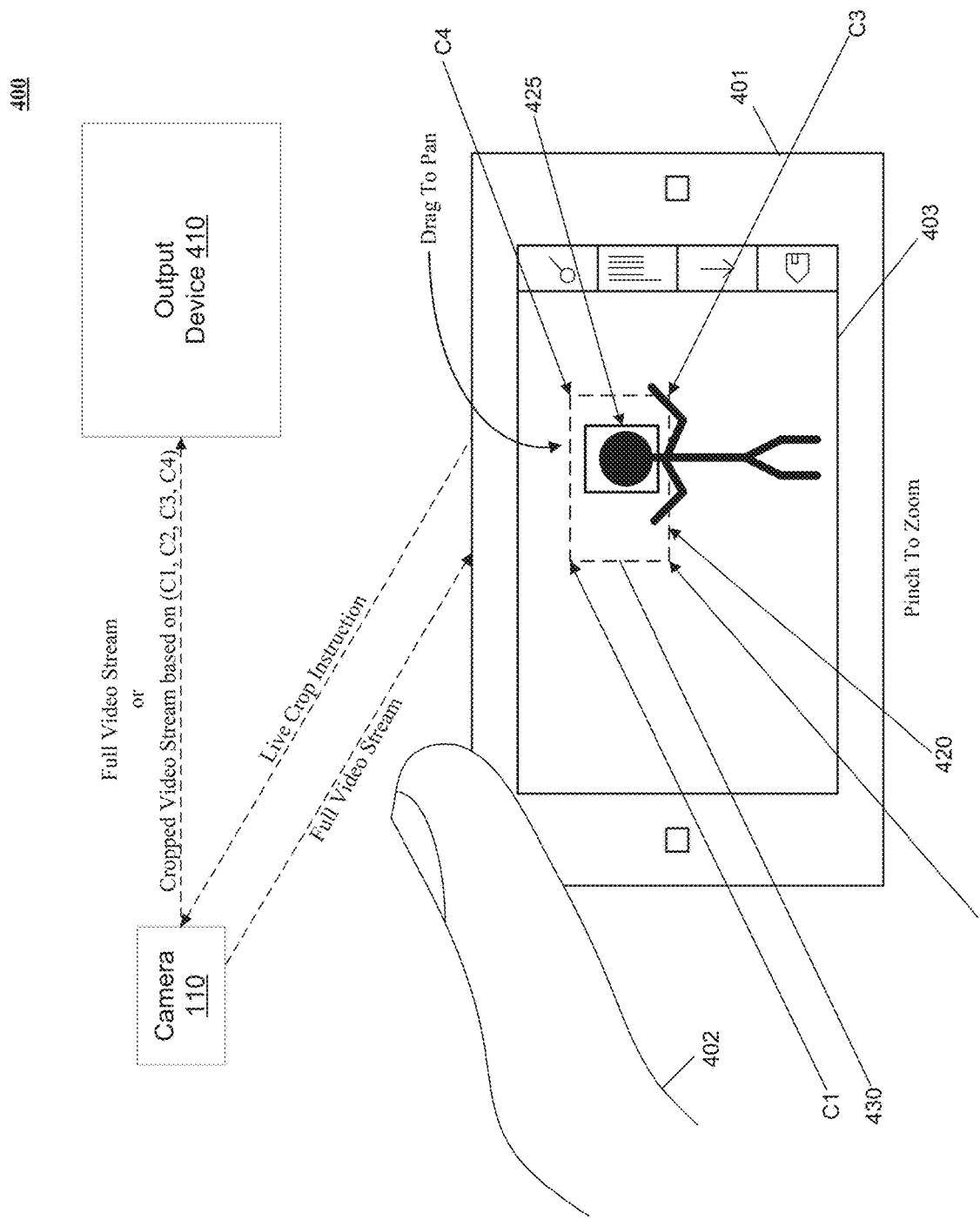
FIG. 4 is a diagram illustrating a system for executing a live cropping technique in accordance with one embodiment of the present disclosure.

FIG. 4 is a diagram illustrating a system 400 for executing a live cropping technique in accordance with one embodiment of the present disclosure. Here, the system 400 may be compared to system 100 of FIG. 1. For instance, the system 400 includes camera 110 that is in communication with a mobile device 401 similar to mobile device 120 of FIG. 1. In this example, system 400 also includes an output device 410 (e.g., a display screen, memory component, etc.) in which a cropped video stream may be sent. In some embodiments, the output device 410 may be coupled to a cloud network infrastructure (e.g., video cloud 130) for receiving the cropped video stream. As noted above, the camera 110 is capable of capturing a single video image and producing dual ultra-high definition encoded streams to enable high-quality video cropping upon request.

In some embodiments, a full FOV of images captured by the camera 110 may be displayed on a touch screen display 403 of the mobile device 401. In one embodiment, the images are analyzed to identify one or more objects of interest within the full FOV. For example, facial features and other types object feature recognition techniques can be used to locate the objects of interests. When an object of interest is located, a field locator may be used to identify a location of the object. By way of example only, as shown in FIG. 4 an object indicator 425 may be placed next to or around the identified object of interest.

In some situations, the full FOV may be cropped to present a certain area for display, such as in a live production environment. For example, the certain area for presentation may highlight the object of interest without distracting a viewer with other objects in the full FOV. In these situations, a crop region 430 indicated by the dashed lines on screen 403 may be identified. For instance, the system 400 may identify user input, such as a touch event associated with the screen 403 of the mobile device 401. In some embodiments, the touch event may correspond to a finger gesture (or pinch gesture) of a user to identify the crop region indicated by the dashed lines 430. In accordance with some embodiments, the system 400 may recognize or identify the occurrence or appearance of known finger gestures in the full FOV of the camera 110. Upon recognition, a known finger gesture can then be interpreted as input associated with a particular command, application, or other invokable action associated with the crop instructions. Thereafter, the mobile device 401 may send a particular crop instruction to the camera 110 to produce a video stream that includes only this crop region to be streamed to the output device 410 directly from the camera 110.

To crop the full FOV, the system 400 may identify coordinates associated with the crop region 430. For example, the system 400 may identify four (4) coordinates (C1, C2, C3 and C4) that outline a boundary of the crop region 430. The system 400 may then select images from the uncompressed video stream of the full FOV for the cropped video stream. To adjust the visual transition from the full FOV to the cropped video stream, the system 400 may apply a smoothing algorithm based on the particular crop instruction received from the mobile device 401.

In one embodiment, the crop instruction may include a pinch to zoom instruction. For example, the system 400 may determine whether a touch event associated with the screen 403 corresponds to a scaling gesture. In this regard, the scaling gesture may shrink or expand the crop region 430. In turn, the system may stream a cropped view of the full FOV zooming in or out of a cropped view identified by the crop region 430. In this example, the full FOV of the screen will be maintained at the display screen 403 of the mobile device 401 while only the cropped video stream is adjusted for display or storage at the output device 410. As noted above, this allows the system 400 to create a multiple-camera experience from a single input video stream.

In another embodiment, the crop instruction may include a drag to pan instruction. For example, the system 400 may determine whether a touch event associated with the screen 403 corresponds to a swipe gesture. In this regard, the swipe gesture may move the crop region indicated by the dashed lines 430 to one area of the screen to another. In turn, the system may stream a cropped view of the full FOV panning across a cropped view identified by the crop region. In this example, the full FOV of the screen will be maintained at the display screen 403 of the mobile device 401 while only the cropped video stream is adjusted for transmission to the output device 410. As noted above, this allows the system 400 to create a multiple-camera experience from a single input video stream.

Figure 5:
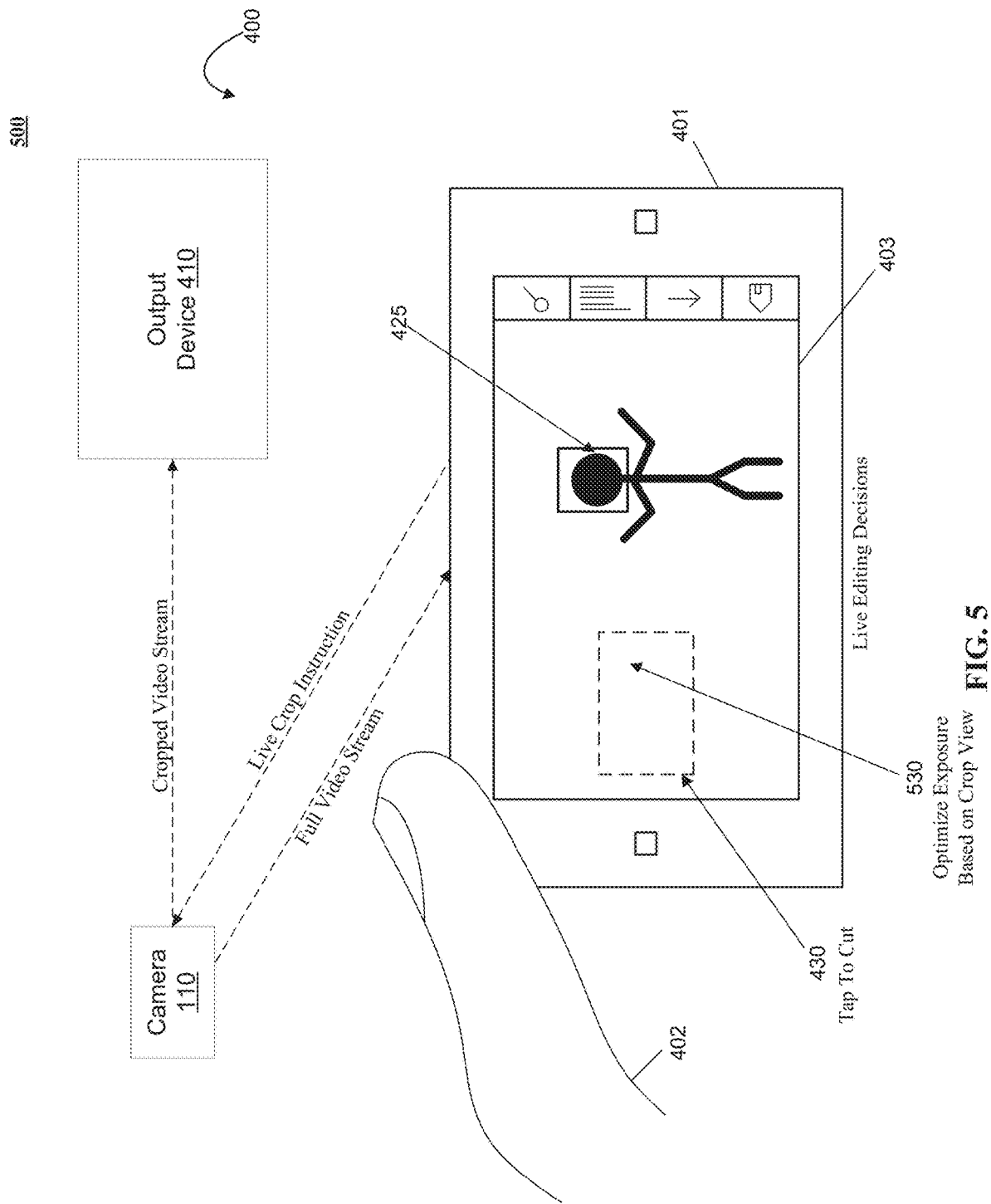
FIG. 5 is another diagram illustrating the system of FIG. 4 in accordance with one embodiment of the present disclosure

FIG. 5 is another diagram 500 illustrating the system 400 of FIG. 4 in accordance with one embodiment of the present disclosure. In this example, the crop instruction may include a tap to cut instruction. For example, the system 400 may determine whether a touch event associated with the screen 403 corresponds to a tap gesture. In this regard, the tap gesture may identify a location to quickly move the crop region 430 indicated by the dashed lines. In turn, the system 400 may stream a cropped view of the full FOV that cuts to the crop region 430. The user can continence to tap to cut to various areas on the full FOV, which may produce a live edit stream that simulates the live production equivalent of multiple cameras filing at an event at the same time. In this example, the full FOV of the screen will be maintained at the display screen 403 of the mobile device 401 while only the cropped video stream is adjusted for display or storage at the output device 410. As noted above, this allows the system 400 to create a multiple-camera experience from a single input video stream.

In some embodiments, various crop instructions can be recorded by system 400 to create an editing decision list that is directly usable by the camera 110. For example, a sequence of crop instructions may be recorded and replayed for automatically adjusting the cropped view of the full FOV. In one embodiment, the system 100 may be able to generate live editing decisions based on a determined configuration or setting. For example, the live editing decisions may make fast-paced edits and cuts to the full FOV that may be typical of a live production environment.

In other embodiment, the system 400 may be configured to optimize the exposure of the full FOV based on the selection of a cropped region. For example, the cropped region may be a particularly dark or lighted area of the full FOV. In this example, the exposure of the full FOV may be adjusted so that details in the cropped region may be more fully realized. In some embodiment, various contrast, hues, colors other type lighting features of the full FOV may be automatically adjusted once the cropped region is selected.

Figure 6:
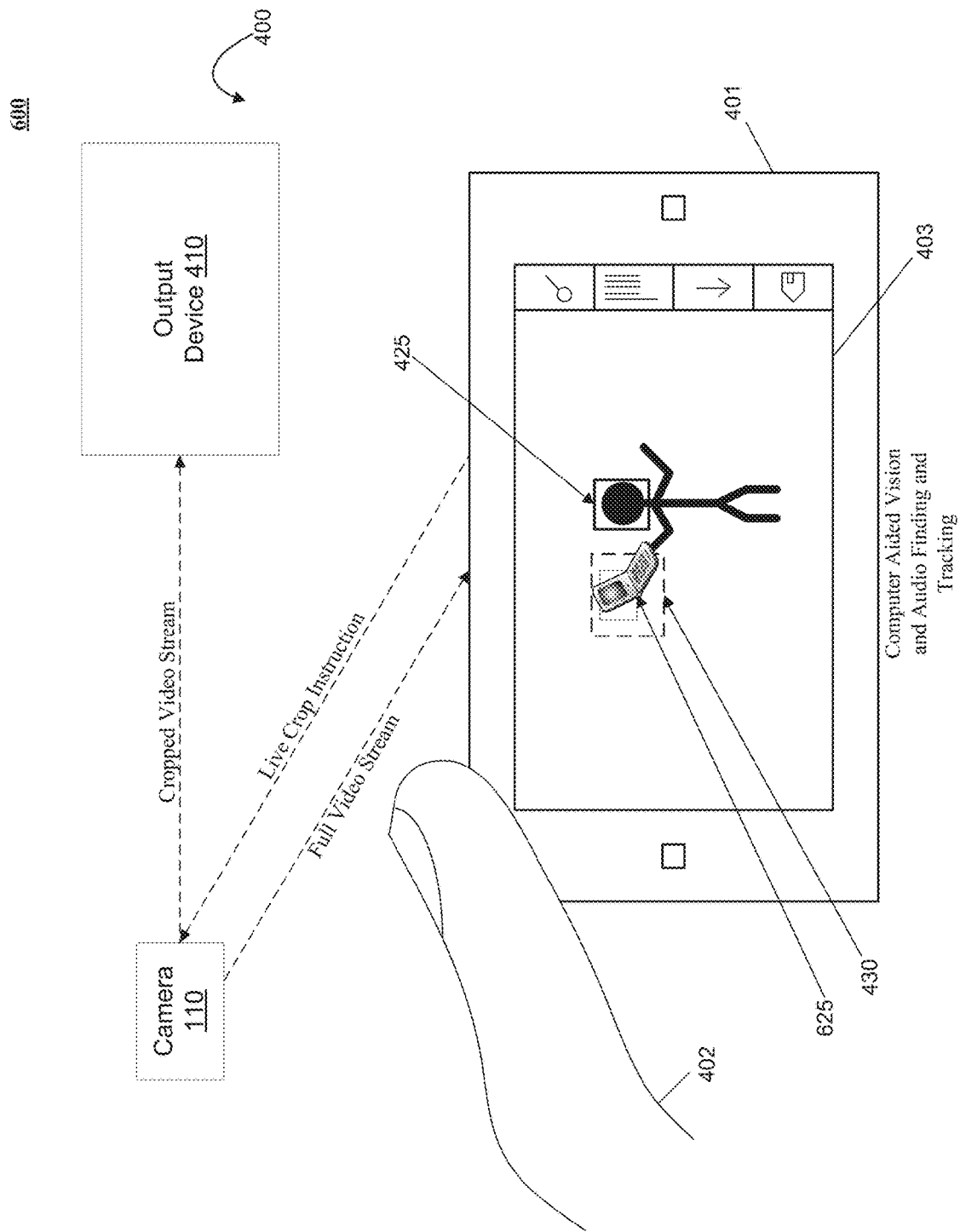
FIG. 6 is yet another diagram illustrating the system of FIG. 4 in accordance with one embodiment of the present disclosure

FIG. 6 is yet another diagram 600 illustrating the system 400 of FIG. 4 in accordance with one embodiment of the present disclosure. In some embodiments, various objects within the full FOV can be identified and tracked with respect to a selected cropped region, such as region 430. For example, system 400 may include computer aided components to visual tracking an object, such as the object identified by indicator 625. The object to be tracked may be identified by a user or by the visual tracking component of system 400. Once the object is identified, a cropped region 430 may be selected for the object. Thereafter, the cropped region 430 may move as the object moves within the full FOV. In turn, the cropped video stream may stream images of the cropped region 430 that includes the tracked object to the output display device 410.

In some embodiments, the system 400 may include an audio tracking component. The audio tracking component is configured to determine a location of an object of interest in the full FOV. This audio tracking may be accomplished based on a number of factors associated with a speech activity associated with the object, such as an amount of noise (e.g., above a threshold audio level) that the object is producing. For example, if the object of interest is a speaker at a conference, the audio tracking component may analyze the audio from the input video stream to identify the speaker's location and movement. Based on the audio tracking, the cropped region 430 may move as the object moves within the full FOV. In turn, the cropped video stream may stream images of the cropped region 430 that includes images of the speaker to the output display device 410. The examples above merely illustrates without limitation a few example live crop editing techniques that can be executed by using system 400, still others are possible by using the component of the system for fast-paced edits that are done in a typical live production environment.

Figure 7:
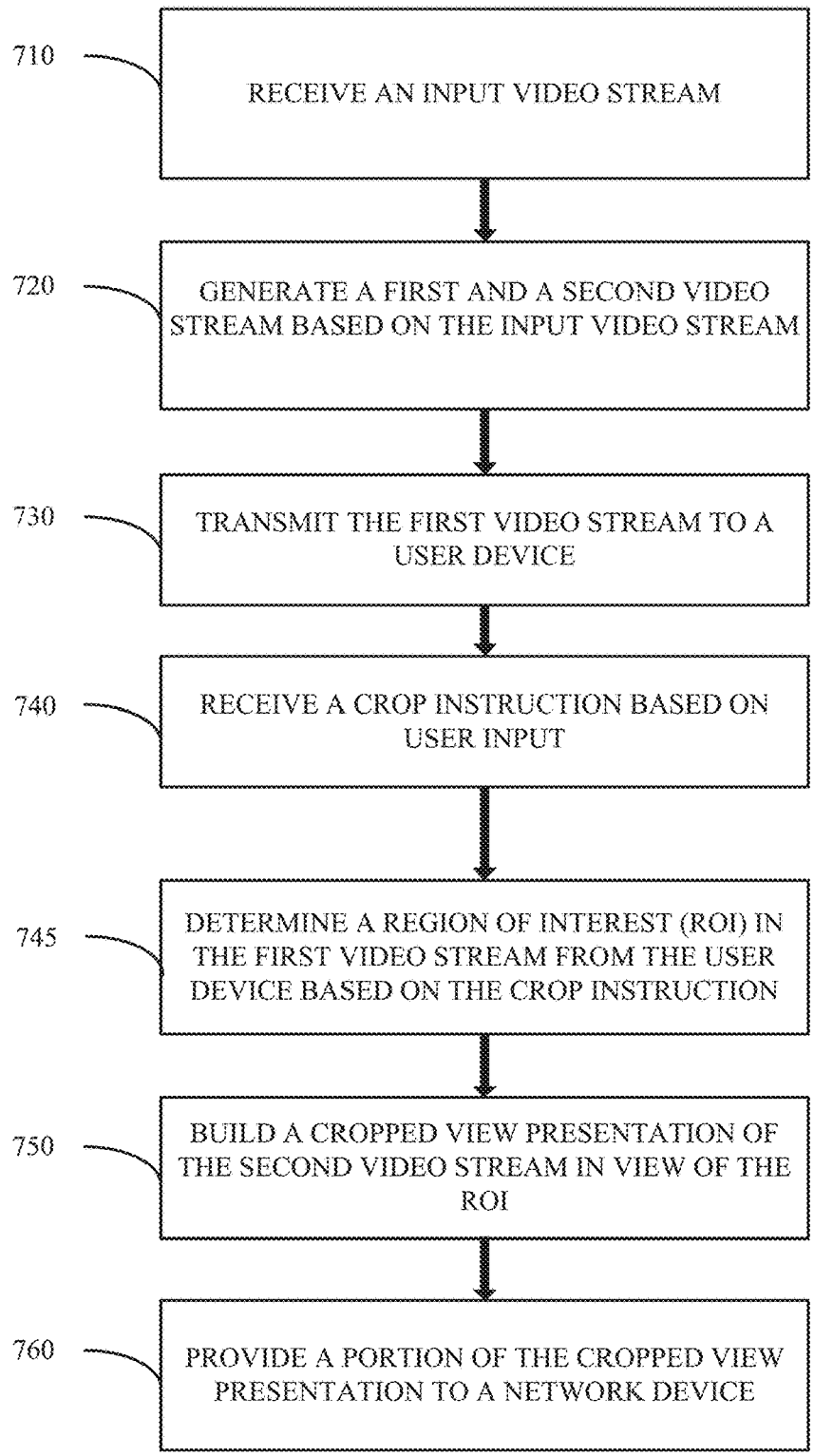
FIG. 7 is a flow diagram illustrating an embodiment of a method in accordance with embodiments of the present disclosure.

FIG. 7 is a flow diagram illustrating an embodiment of a method 700 in accordance with embodiments of the present disclosure. To better aid in understanding an example of some of the aspects described above, for example, that are related to live crop editing, reference is now made to example flow diagram. In one embodiment, the video streaming camera 110 of FIG. 1 may perform method 700.

The method 700 may be performed by processing logic associated with the video streaming camera 110 that may comprise hardware (circuitry, dedicated logic, etc.), software, or a combination of both. Alternatively, in some other embodiments, some or all of the method 700 might be performed by other components of system 100. It should be noted that blocks depicted in FIG. 7 can be performed simultaneously or in a different order than that depicted.

Method 700 begins at block 710 where an input video stream is received. In block 720, a first and a second video stream are generated based on the input video stream. In block 730, the first video stream is provided to a user device. Thereafter, a crop instruction is received from the first user device in block 740 based on user input. In block 745, a region of interest (ROI) in the first video stream is determined based on the crop instruction. In block 750, a cropped view of the second video stream is determined in view of the ROI. In this regard, coordinates of the cropped view and the ROI correspond. In block 760, a portion of the cropped view is provided to a network device.

Figure 8:
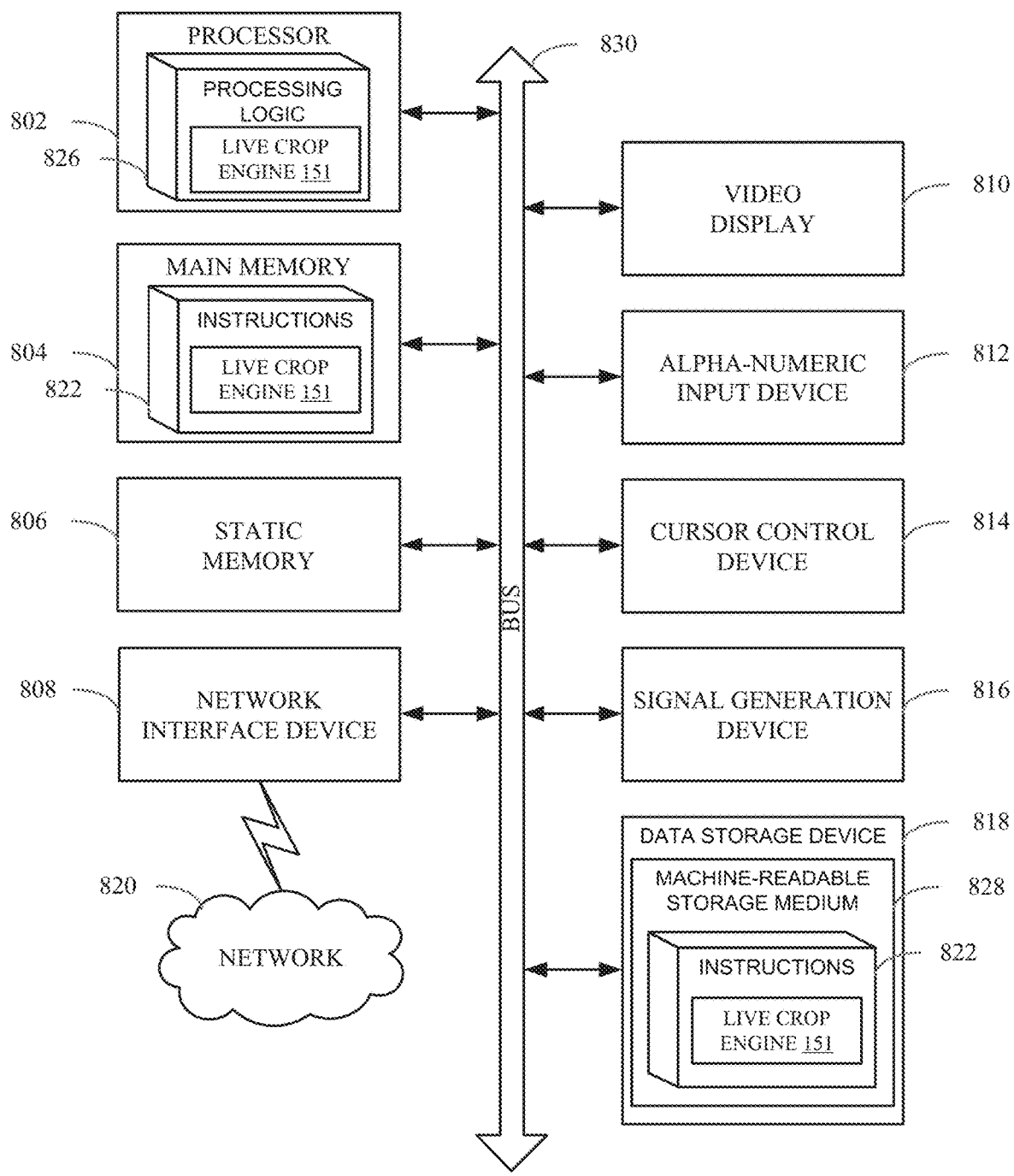
FIG. 8 illustrates a diagrammatic representation of a machine in the exemplary form of a computer system.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 may be comprised of a processing device 802, a main memory 804 (e.g., read-only memory (ROM), flash memory, dynamic random access memory (DRAM) (such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. Processing device 802 is configured to execute processing logic 826 for performing the operations and steps discussed herein.

Computer system 800 may further include a network interface device 808. Computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

Data storage device 818 may include a machine-readable storage medium (or more specifically a computer-readable storage medium) 828 having one or more sets of instructions (e.g., software 822) embodying any one or more of the methodologies of functions described herein. For example, software 822 may store instructions for the live crop engine 151 to support a video stream encoding system with live crop editing and recording as disclosed herein. Software 822 may also reside, completely or at least partially, within main memory 804 and/or within processing device 802 during execution thereof by computer system 800; main memory 804 and processing device 822 also constituting machine-readable storage media. Software 822 may further be transmitted or received over a network 820 via network interface device 808.

Machine-readable storage medium 828 may also be used to store instructions to conduct an auction for block order trading. While machine-readable storage medium 828 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present disclosure. The term "machine-readable storage medium" shall accordingly be taken to include, but not be limited to, solid-state memories, and optical and magnetic media.

Some portions of the detailed descriptions are presented in terms of algorithms and symbolic representations of operations on data bits within a computer memory. These algorithmic descriptions and representations are the means used by those skilled in the video processing arts to most effectively convey the substance of their work to others skilled in the art. An algorithm is here, and generally, conceived to be a self-consistent sequence of steps leading to a desired result. The steps are those requiring physical manipulations of physical quantities.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "receiving", "determining", "generating", "transmitting", "identifying", "cropping", "selecting", "executing", "publishing", "processing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Whereas many alterations and modifications of the present disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method comprising:
    receiving, by a camera device, an input video stream depicting an image;
    transmitting, by the camera device, dual output video streams based on the input video stream comprising a first video stream transmitting to a mobile device and a second video stream transmitting to a network device;
    receiving, by the camera device, a crop instruction associated with the image based on a touch screen gesture received on the mobile device, wherein the first video stream depicts a full field of view of the image on the mobile device, and wherein the full field of view is maintained on the mobile device while receiving the crop instruction;
    determining, by the camera device, a region of interest in the first video stream based on coordinates specified by the crop instruction to generate a cropped view presentation of the full field of view, wherein the second video stream depicts the cropped view presentation;
    selecting, by the camera device, a smoothing algorithm to adjust a visual transition from the full field of view in the first video stream to the cropped view presentation in the second video stream, the smoothing algorithm selected based at least in part on a crop instruction type identified on the mobile device; and
    providing, by the camera device, the cropped view presentation in the second video stream for display at the network device while continuing to provide the full field of view in the first video stream for display at the mobile device.

2. The method of claim 1, wherein the crop instruction type comprises at least one of: a pinch to zoom instruction, a tap to cut instruction or a drag to pan instruction.

3. The method of claim 1, further comprising adjusting an exposure setting of the full field of view associated with the first video stream based on a selection of the region of interest.

4. The method of claim 1, further comprising selecting one or more frames from the input video stream to transition between the full field of view and the region of interest at the display of the network device.

5. A method of claim 1, further comprising:
    tracking an object within the full field of view associated with the first video stream;
    associating the cropped view presentation of the second video stream with the object; and
    adjusting the cropped view presentation at the display of the network device as the object moves within the full field of view.

6. The method of claim 5, wherein the tracking comprises detecting a location of the cropped view presentation based on a facial feature associated with the object within the full field of view.

7. The method of claim 5, wherein the tracking comprises detecting a location of the cropped view presentation based on a speech activity associated with the object within the full field of view.

8. A system comprising:
    a memory to store video streams, and
    a processing device of a camera device, operatively coupled to the memory to:
        receive an input video stream depicting an image;

transmit dual output video streams based on the input video stream comprising a first video stream to transmit to a mobile device and a second video stream to transmit to a network device;

receive a crop instruction associated with the image based on a touch screen gesture received on the mobile device, wherein the first video stream depicts a full field of view of the image on the mobile device, and wherein the full field of view is maintained on the mobile device while receiving the crop instruction;

determine a region of interest in the first video stream based on coordinates specified by the crop instruction to generate a cropped view presentation of the full field of view, wherein the second video stream depicts the cropped view presentation;

select a smoothing algorithm to adjust a visual transition from the full field of view in the first video stream to the cropped view presentation in the second video stream, the smoothing algorithm selected based at least in part on a crop instruction type identified on the mobile device; and provide the cropped view presentation in the second video stream for display at the network device while continuing to provide the full field of view in the first video stream for display at the mobile device.

9. The system of claim 8, wherein the crop instruction type comprises at least one of: a pinch to zoom instruction, a tap to cut instruction or a drag to pan instruction.

10. The system of claim 8, wherein the processing device is further operatively coupled to the memory to adjust an exposure setting of the full field of view associated with the first video stream based on a selection of the region of interest.

11. The system of claim 8, wherein the processing device is further operatively coupled to the memory to select one or more frames from the input video stream to transition between the full field of view and the region of interest at the display of the network device.

12. A system of claim 8, wherein the processing device is further operatively coupled to the memory to:

track an object within the full field of view associated with the first video stream;

associate the cropped view presentation of the second video stream with the object; and adjust the cropped view presentation at the display of the network device as the object moves within the full field of view.

13. The system of claim 12, wherein to track, the processing device is further operatively coupled to the memory to detect a location of the cropped view presentation based on a facial feature associated with the object within the full field of view.

14. The system of claim 12, wherein to track, the processing device is further operatively coupled to the memory to detect a location of the cropped view presentation based on a speech activity associated with the object within the full field of view.

15. A non-transitory computer-readable storage medium comprising executable instructions that when executed, by a processing device of a camera device, cause the processing device to:

receive an input video stream depicting an image;

transmit dual output video streams based on the input video stream comprising a first video stream to transmit to a mobile device and a second video stream to transmit to a network device;

receive a crop instruction associated with the image based on a touch screen gesture received on the mobile device, wherein the first video stream depicts a full field of view of the image on the mobile device, and wherein the full field of view is maintained on the mobile device while receiving the crop instruction;

determine a region of interest in the first video stream based on coordinates specified by the crop instruction to generate a cropped view presentation of the full field of view, wherein the second video stream depicts the cropped view presentation;

select a smoothing algorithm to adjust a visual transition from the full field of view in the first video stream to the cropped view presentation in the second video stream, the smoothing algorithm selected based at least in part on a crop instruction type identified on the mobile device; and provide the cropped view presentation in the second video stream for display at the network device while continuing to provide the full field of view in the first video stream for display at the mobile device.

16. The non-transitory computer-readable storage medium of claim 15, wherein the crop instruction type comprises at least one of: a pinch to zoom instruction, a tap to cut instruction or a drag to pan instruction.

* * * * *